United States Patent [19]

Hayashi

[11] Patent Number: 4,774,923
[45] Date of Patent: Oct. 4, 1988

[54] PRESSURE REGULATING VALVE

[75] Inventor: Kenji Hayashi, Obu, Japan

[73] Assignee: Aisan Kogyo Kabushiki Kaisha, Obu, Japan

[21] Appl. No.: 116,550

[22] Filed: Nov. 4, 1987

[30] Foreign Application Priority Data

Nov. 7, 1986 [JP] Japan .................. 61-266194
Nov. 7, 1986 [JP] Japan .................. 61-266195

[51] Int. Cl.$^4$ .................................. F02M 39/00
[52] U.S. Cl. ............................... 123/463; 123/381
[58] Field of Search ............. 123/381, 463, 456, 467, 123/452

[56] References Cited

U.S. PATENT DOCUMENTS

| | | | |
|---|---|---|---|
| 3,204,623 | 9/1965 | Isley | 123/381 |
| 4,222,713 | 9/1980 | DeKeyser | 123/381 |
| 4,284,039 | 8/1981 | Bellicardi | 123/463 |
| 4,286,562 | 9/1981 | Stoltman | 123/463 |
| 4,404,944 | 9/1983 | Yamazaki | 123/463 |
| 4,419,976 | 12/1983 | Hosaka | 123/463 |
| 4,426,978 | 1/1984 | Sasaki | 123/463 |
| 4,481,926 | 11/1984 | Miri | 123/463 |
| 4,522,177 | 6/1985 | Kawai | 123/381 |
| 4,635,603 | 1/1987 | Hara | 123/463 |

FOREIGN PATENT DOCUMENTS

| | | | |
|---|---|---|---|
| 1576482 | 5/1970 | Fed. Rep. of Germany | 123/363 |
| 2548644 | 5/1976 | Fed. Rep. of Germany | 123/363 |
| 2903907 | 8/1979 | Fed. Rep. of Germany | 123/363 |
| 2904910 | 8/1980 | Fed. Rep. of Germany | 123/363 |
| 3238106 | 4/1984 | Fed. Rep. of Germany | 123/363 |
| 3613026 | 10/1986 | Fed. Rep. of Germany | 123/363 |
| 0133440 | 8/1983 | Japan | 123/381 |

Primary Examiner—Carl Stuart Miller
Attorney, Agent, or Firm—Dennison, Meserole, Pollack & Scheiner

[57] ABSTRACT

A pressure regulating valve for regulating a pressure of fuel to be supplied to a fuel injection device including a diaphragm chamber having a connecting portion for inducing an intake manifold vacuum in the vicinity of a nozzle hole of the fuel injection device and having a temperature sensitive spring formed of a shape memory alloy and a valve member operable by the temperature sensitive spring, wherein when a fuel temperature is equal to or greater than a set temperature of the shape memory alloy, the valve member of the temperature sensitive valve closes a fuel passage in the fuel discharge pipe, and a high pressure valve adapted to open the fuel passage in the fuel discharge pipe when the temperature sensitive valve is closed and the pressure in the fuel chamber is equal to or greater than a second set pressure higher than the first set pressure, whereby when the fuel temperature is less than the set temperature, the pressure in the fuel chamber is adjusted to be equal to the first set pressure, while when the fuel temperature is equal to or greater than the set temperature, the pressure in the fuel chamber is adjusted to be equal to the second set pressure.

10 Claims, 6 Drawing Sheets

PRESSURE REGULATING VALVE

BACKGROUND OF THE INVENTION

The present invention relates to a pressure regulating valve, and more particularly to a pressure regulating valve primarily for use with a fuel injection device for an automotive internal combustion engine.

FIG. 1 shows a known fuel injection system for an automotive internal combustion engine. As shown in FIG. 1, a pressure regulating valve 2 is provided upstream of a fuel injection valve 1 to maintain an absolute fuel pressure at a value higher than an absolute intake manifold pressure by a fixed value (normally 2.55 kg/cm$^2$). A fuel pressure to be hereinafter referred means a gauge pressure obtained by subtracting an atmospheric pressure from the absolute fuel pressure, and an intake manifold pressure to be hereinafter referred means a vacuum obtained by subtracting the absolute intake manifold pressure from the atmospheric pressure. The fuel injection system shown in FIG. 1 includes a fuel tank 3, a fuel pump 4, a fuel filter 5, a fuel damper 6 and a surge tank 7. A suction air is induced in the direction of arrow as shown. A vacuum passage 8 is provided to induce a vacuum in the surge tank 7 into the fuel regulating valve 2. A fuel passage 9 is provided to communicate the fuel pump 4 with the fuel injection valve 1 and the pressure regulating valve 2. A fuel return passage 10 is provided to return an excessive fuel to the fuel tank 3.

FIG. 2 is a vertical sectional view of the conventional pressure regulating valve 2. A diaphragm 13 is fixed between upper and lower casings 11 and 12 to define a diaphragm chamber 14 in the upper casing 11 and a fuel chamber 15 in the lower casing 12. A diaphragm spring 16 is inserted in the diaphragm chamber 14, and a spring force of the diaphragm spring 16 is set to a value such that the absolute fuel pressure is regulated to be always higher than the absolute intake manifold pressure by a fixed value (normally 2.55 kg/cm$^2$) by means of a pressure regulating mechanism to be hereinafter described. The casing 11 is connected with a vacuum connection pipe 17 communicated through the vacuum passage 8 to the surge tank 7 (see FIG. 1). The casing 12 is connected at its side portion with a fuel inlet connection pipe 18 communicated through the fuel passage 9 to the fuel injection valve 1 and the fuel pump 4 (see FIG. 1). The casing 12 is also connected at its axial portion with a fuel outlet connection pipe 19 in such a manner that the upper end portion of the fuel outlet connection pipe 19 projects into the casing 12 and is provided with a seat member 20. A valve member 21 is mounted at a central portion of the diaphragm 13 to open and close the fuel outlet by the reciprocation of the diaphragm 13.

In operation, when the diaphragm 13 is urged upwardly by the fuel pressure against the spring force (2.55 kg/cm$^2$), an excessive fuel is discharged from the fuel outlet connection pipe 19 and is returned through the fuel return passage 10 to the fuel tank 3. At this time, since the pressure in the diaphragm chamber 14 is equal to that in the surge tank 7, the fuel pressure is fluctuated with a change in the intake manifold vacuum. Therefore, the fuel pressure is so controlled as to satisfy the relation that the fuel pressure is equal to the fixed value minus the intake manifold vacuum. The fixed value is adjusted by the spring force of the diaphragm spring, and the latter is set so that the fixed value is usually 2.55 kg/cm$^2$. (Japanese Patent Publication No. 49-37049, for example)

As a fuel for the automotive internal combustion engine, a low-boiling point fuel such as alcohol containing fuel and high reed vapor pressure fuel has been recently utilized. Such a low-boiling point fuel generates a vapor at a fuel temperature of about 80° C. Particularly, in the case of parking the vehicle under the blazing sun for a long time, the temperature of fuel in the fuel pipe is greatly increased to cause the generation of fuel vapor.

Such vaporization of the fuel at high temperatures can be prevented by increasing a fuel pressure. As to the low-boiling point fuel as mentioned above, the fuel pressure should be set to 3.5 kg/cm$^2$ at the fuel temperature of about 80° C. in order to prevent the vaporization.

However, when the spring force of the diaphragm spring 16 is set to balance the fuel pressure of 3.5 kg/cm$^2$, a discharge rate of the motor driven fuel pump 3 is decreased. If the discharge rate of the fuel pump 3 is intended to be increased under this condition, a current flowing in the fuel pump 3 must be increased. As a result, wear of a brush and a commutator of a d.c. motor is increased, causing a problem in durability of the motor driven fuel pump 3.

SUMMARY OF THE INVENTION

Accordingly, it is an object of the present invention to provide a pressure regulating valve which is designed to increase a fuel pressure up to a certain value (3.5 kg/cm$^2$, for example) only when a fuel temperature increases to a value higher than a predetermined temperature (about 80° C., for example), thereby preventing the vaporization of the fuel even in using a low-boiling point fuel.

According to the present invention, there is provided a pressure regulating valve for regulating a pressure of fuel to be supplied to a fuel injection device, comprising a diaphragm chamber having a connecting portion for inducing an intake manifold vacuum in the vicinity of a nozzle hole of the fuel injection device, a fuel chamber having a connecting portion for inducing a fuel and located adjacent to the diaphragm chamber, a diaphragm for partitioning the diaphragm chamber from the fuel chamber, a diaphragm spring accommodated in the diaphragm chamber and biasing the diaphragm toward the fuel chamber, a valve member mounted to the diaphragm, a fuel discharging pipe communicated at its one end with the fuel chamber and communicated at the other end with the outside of the pressure regulating valve, said fuel discharging pipe being provided at its one end with a valve seat against which the valve member is releasably seated, wherein when a fuel pressure in the fuel chamber is equal to or greater than a first set pressure equal to the sum of a set pressure of the diaphragm spring and a pressure in the diaphragm chamber, the valve member moves away from the valve seat, while when the pressure in the fuel chamber is less than the first set pressure, the valve member seats on the valve seat, a temperature sensitive valve having a temperature sensitive spring formed of a shape memory alloy and a valve member operable by the temperature sensitive spring, wherein when a fuel temperature is equal to or greater than a set temperature of the shape memory alloy, the valve member of the temperature sensitive valve closes a fuel passage in the fuel discharge pipe, and a high pressure valve adapted to open the fuel passage in the fuel discharge pipe when the temperature sensitive valve is closed and the pressure in the fuel chamber is equal to or greater than a second set pressure higher than the first set pressure, whereby when the fuel temperature is less than the set temperature, the pressure in the fuel chamber is adjusted to be equal to the first set pressure, while when the fuel temperature is equal to or greater than the set temperature, the pressure in the fuel chamber is adjusted to be equal to the second set pressure.

In operation, when the fuel temperature ranges from a low temperature to the set temperature, the temperature sensitive valve located in the fuel discharge pipe is opened, and the first pressure regulating mechanism is operated to maintain the fuel pressure at the first set pressure.

When the fuel temperature increases to the set temperature or more, the temperature sensitive spring formed of shape memory alloy expands to close the temperature sensitive valve and thereby close the fuel passage in the fuel discharge pipe. Accordingly, the fuel pressure in the fuel chamber is increased by the discharge pressure from the motor driven pump, and when the fuel pressure becomes the second set pressure (3.5 kg/cm$^2$, for example) or more higher than the first set pressure, the high pressure valve is opened to maintain the fuel pressure at the second set pressure.

The invention will be more fully understood from the following detailed description and appended claims when taken with the drawings.

DETAILED DESCRIPTION OF THE PREFERRED EMBODIMENTS

Figure 1:
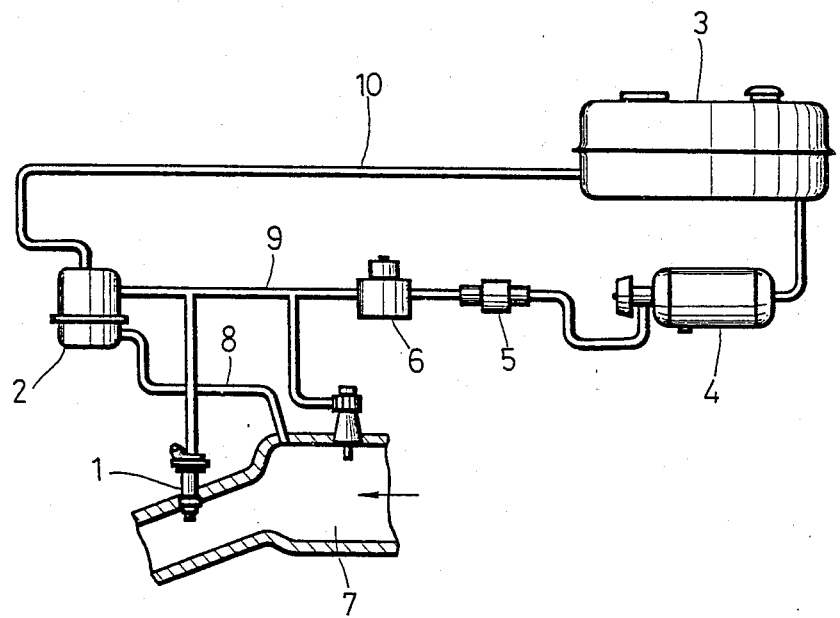
FIG. 1 is a diagrammic illustration of the fuel injection system for an automobile.
Figure 2:
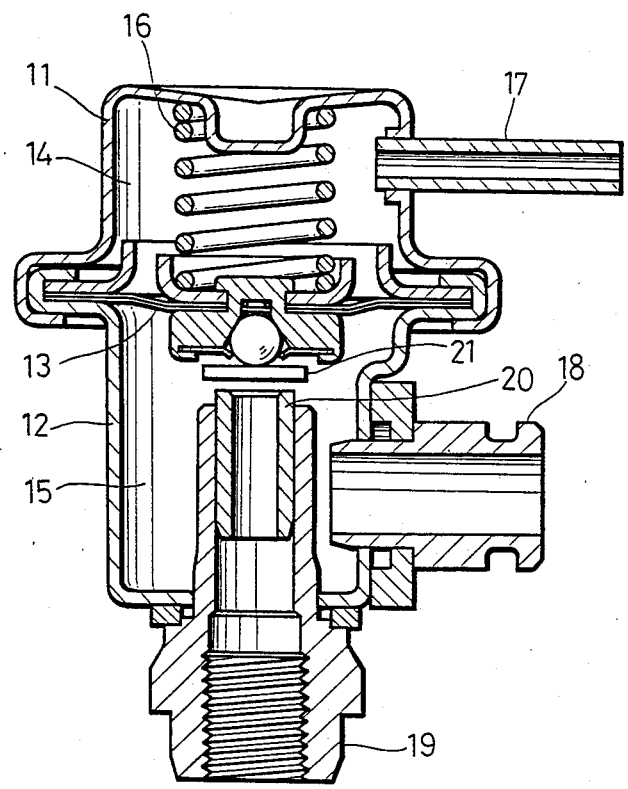
FIG. 2 is a vertical sectional view of the conventional pressure regulating valve.

There will now be described some preferred embodiments of the present invention, wherein the same elements as of the conventional device shown in FIG. 2 are denoted by the same reference numerals.

Figure 3:
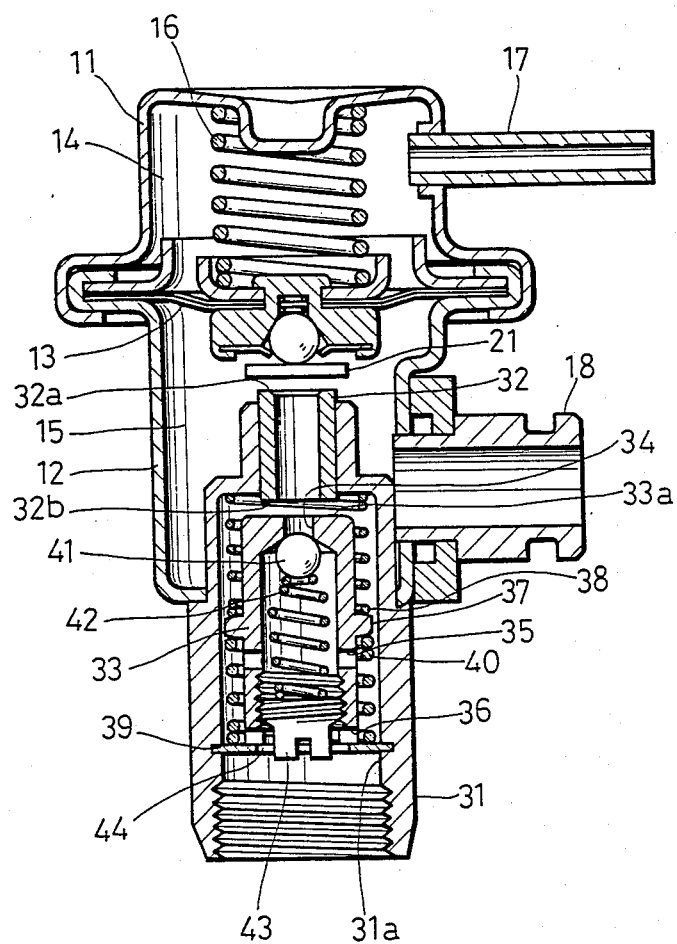
FIG. 3 is a vertical sectional view of the pressure regulating valve of a first preferred embodiment according to the present invention under a normal pressure condition.
Figure 4:
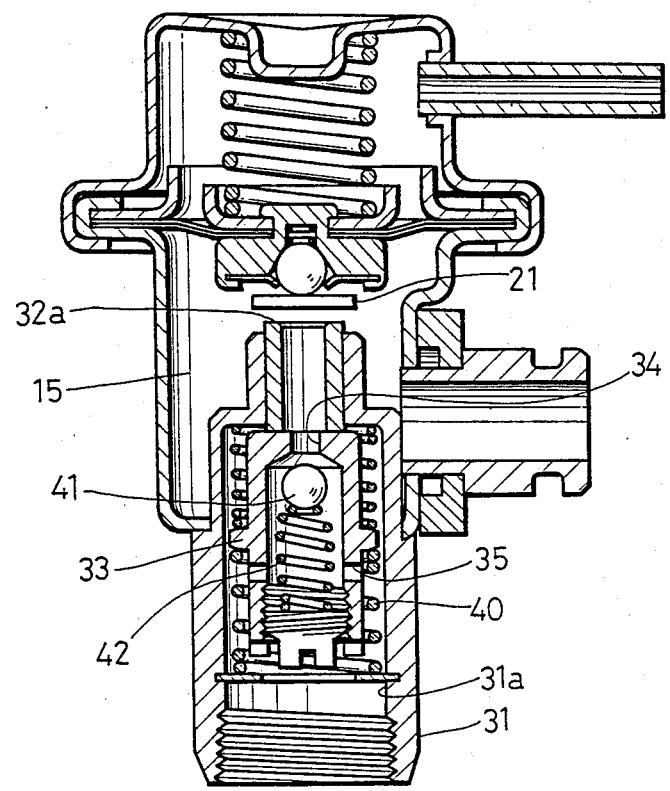
FIG. 4 is a vertical sectional view similar to FIG. 3 under a high-temperature high-pressure condition.

Referring to FIGS. 3 and 4, reference numeral 31 designates a fuel outlet connection pipe having an end portion projecting into a fuel chamber 15. The connection pipe 31 is provided at its upper end with a seat member 32. The seat member 32 is formed at its upper end with an outer valve seat 32a and at its lower end with an inner valve seat 32b. Reference numeral 33 designates a temperature sensitive valve formed of an inverted U-shaped cylindrical member. The temperature sensitive valve 33 is arranged coaxially in the connection pipe 31 in such a manner that an upper end surface of the valve 33 is opposed to the inner valve seat 32b. The upper end surface of the valve 33 acts as a valve member 33a adapted to abut against the inner valve seat 32b. The temperature sensitive valve 33 is formed at its upper central portion with a fuel inlet 34 and at its side portion with plural communication holes 35. Further, the temperature sensitive valve 33 is formed at its lower opening end with plural communication holes 36 for communicating the outside of the valve 33 with a fuel outlet passage 31a of the connection pipe 31. The temperature sensitive valve 33 is formed at its outer circumference with a flange 37, and a back spring 38 is inserted between the flange 37 and a shoulder formed between a small-diameter portion and a large-diameter portion of the connection pipe 31. The back spring 38 operates to normally bias the temperature sensitive valve 33 in a valve opening direction and abut against a stopper 39 provided at the lower end portion of the connection pipe 31. The stopper 39 has plural communication holes 44. Thus, the fuel can flow through communication holes 35, 36 and 44 in the connection pipe 31. A temperature sensitive spring 40 is inserted between the stopper 39 and the flange 37. The temperature sensitive spring 40 is formed of shape memory alloy functioning to expand at temperatures not less than a set temperature. In this embodiment, the set temperature is equal to a fuel temperature of 80° C. as usually obtained upon stoppage after continuous running of the automobile.

A spherical high-pressure valve 41 opening and closing the fuel inlet 34 is provided in the temperature sensitive valve 33 in such a manner as to be supported by a high-pressure spring 42. An adjusting screw 43 is provided to adjust a spring force of the high-pressure spring 42, so that the accuracy of a set pressure may be increased. In this embodiment, the spring force of the high pressure spring 42 is adjusted to balance a second set pressure higher than a first set pressure (normally 2.55 kg/cm$^2$ in the prior art), so as to prevent the vaporization of the low-boiling point fuel at high temperatures higher than 80° C. The second set pressure is adjusted to balance the fuel pressure of 3.5 kg/cm$^2$ (gauge pressure) in this embodiment.

In operation, the fuel fed under pressure from the fuel pump 4 is induced from the inlet connection pipe 18 into the fuel chamber 15. Depending upon a difference between the forces applied to the diaphragm 13 from both upper and lower sides, one being caused by the fuel pressure acting on an effective pressure receiving area of the diaphragm 13 and the other being caused by the sum of a biasing force of the diaphragm spring 16 and the intake manifold pressure acting on an effective pressure receiving area of the diaphragm 13, the diaphragm 13 is displaced to balance both the above forces (see FIG. 3). As a result, when the fuel pressure becomes the first set pressure (normally 2.55 kg/cm$^2$) or more, the valve member 21 fixed to the diaphragm 13 moves away from the valve seat 32a to allow the fuel to flow out through the fuel outlet passage 31a. Then, when the fuel pressure is decreased less than the first set pressure, the fuel outlet passage 31a is closed by the valve member 21, thereby substantially equalizing the fuel pressure to the first set pressure.

When the fuel temperature increases to the set temperature of 80° C. or more, the temperature sensitive spring 40 expands to compress the back spring 38 and urge the valve member 33a of the temperature sensitive valve 33 against the inner valve seat 32b, thereby shutting off the discharge of the fuel. As the fuel outlet passage 31a is closed in this manner, the fuel pressure in the fuel chamber 15 is increased. When the fuel pressure becomes higher than a certain value, the high-pressure valve 41 having closed the fuel inlet 34 of the temperature sensitive valve 33 operates to compress the high-pressure spring 42, and is displaced as shown in FIG. 4. As a result, the excess fuel is discharged through a gap between inlet 34 and valve 41, and the fuel pressure is always controlled to be equal to a certain value. The fuel pressure controlled in this way will be hereinafter referred to as a second set pressure, which is equal to 3.5 kg/cm² (gauge pressure) higher than the first set pressure. When the valve 41 moves away from the inlet 34, the fuel is discharged through the fuel outlet ports 35, the fuel outlet passage 31a to the fuel return passage 10, and is returned to the fuel tank 3.

When the fuel temperature decreases to temperatures lower than 80° C., the temperature sensitive spring 40 formed of shape memory alloy contracts. As a result, the back spring 38 urges downwardly the temperature sensitive valve 33 until the valve 33 abuts against the stopper 39. Accordingly, the fuel is discharged through the outside of the temperature sensitive valve 33 and the communication holes 36 and 44 to the fuel outlet passage 31a, and is returned through the fuel return passage 10 to the fuel tank 3. Then, the fuel pressure is adjusted at the gap between the valve member 21 and the outer valve seat 32a, and is returned to the first set pressure (2.55 kg/cm²).

The operation of the pressure regulating valve is effective between the normal set pressure (the first set pressure) and the higher set pressure (the second set pressure) during a short period of time at starting of the internal combustion engine. Therefore, such a change between the first and second set pressures does not adversely affect the running performance of the vehicle.

Figure 5:
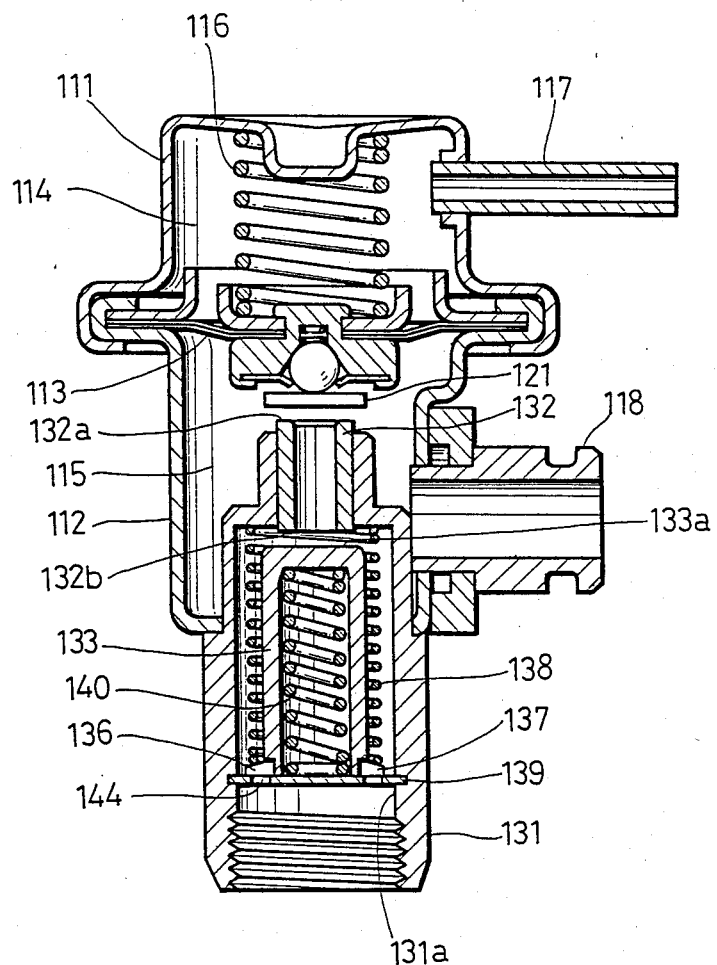
FIG. 5 is a vertical sectional view of the pressure regulating valve of a second preferred embodiment according to the present invention under a normal pressure condition.
Figure 6:
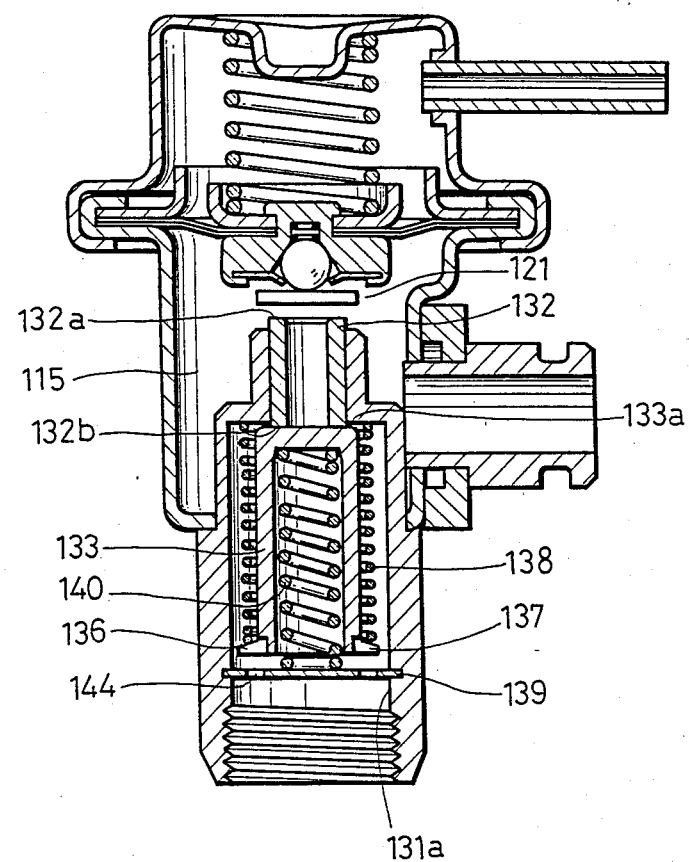
FIG. 6 is a vertical sectional view similar to FIG. 5 under a high-temperature high-pressure condition.

Referring next to FIGS. 5 and 6 which shows a second preferred embodiment, reference numeral 131 designates a fuel outlet connection pipe having an end portion projecting into a fuel chamber 115. The connection pipe 131 is provided at its upper end with a seat member 122. The seat member 132 is formed at its upper end with an outer valve seat 132a and at its lower end with an inner valve seat 132b. Reference numeral 133 designates a high-pressure temperature sensitive valve formed of an inverted U-shaped cylindrical member. The high-pressure temperature sensitive valve 133 is arranged coaxially in the connection pipe 131 in such a manner that an upper end surface of the valve 133 is opposed to the inner valve seat 132b. The upper end surface of the valve 133 acts as a valve member 133a adapted to abut against the inner valve seat 132b. The high-pressure temperature sensitive valve 133 is formed at its lower end with a flange 137, and a back spring 138 is inserted between the flange 137 and a shoulder formed between a small-diameter portion and a large-diameter portion of the connection pipe 131. The back spring 138 operates to normally bias the valve 133 in a valve opening direction to make the valve 133 abut against a stopper 139 located at the lower end of the connection pipe 131. The flange 137 and the stopper 139 are formed with communication holes 136 and 144, respectively, at the coincident positions, thereby communicating the outside of the valve 133 with the fuel outlet passage 131a of the connection pipe 131. A temperature sensitive spring 140 is inserted in the valve 133 in such a manner as to be received by the stopper 139 at one end. The temperature sensitive spring 140 is formed of shape memory alloy functioning to expand at temperatures not less than a set temperature. In this embodiment, the set temperature is a fuel temperature of 80° C. as usually obtained upon stoppage after continuous running of the automobile.

In operation, the fuel fed under pressure from the fuel pump 4 is induced from the inlet connection pipe 118 into the fuel chamber 115. Depending upon a difference between the forces applied to the diaphragm 113 from both upper and lower sides, one being caused by the fuel pressure acting on an effective pressure receiving area of the diaphragm 113 and the other being caused by the sum of a biasing force of the diaphragm spring 116 and the intake manifold pressure acting on the effective pressure receiving area of the diaphragm 113, the diaphragm 113 is displaced to balance both the above forces(see FIG. 5). As a result, when the fuel pressure becomes the first set pressure (normally 2.55 kg/cm²) or more, the valve member 121 fixed to the diaphgram 113 moves away from the valve seat 132a to allow the fuel to flow out through the fuel outlet passage 131a. Then, when the fuel pressure is decreased less than the first set pressure, the fuel outlet passage 131a is closed by the valve member 121, thereby substantially equalizing the fuel pressure to the first set pressure. The fuel in the fuel outlet connection pipe 131 is discharged through the outside of the high-pressure temperature sensitive valve 133 and the communication holes 136 and 144 to the fuel outlet passage 131a, and is returned through the fuel return passage 10 to the fuel tank 3.

When the fuel temperature increases to the set temperature of 80° C. or more, the temperature sensitive spring 140 expands to compress the back spring 138 and urge the valve member 133a of the high-pressure temperature sensitive valve 133 against the inner valve seat 132b, thereby shutting off the discharge of the fuel as shown in FIG. 6. As the fuel outlet passage 131a is closed in this manner, the fuel pressure in the fuel chamber 115 is increased. When the fuel pressure becomes a predetermined pressure of 3.5 kg/cm² (gauge pressure) or more, the high-pressure temperature sensitive valve 133 having abutted against the inner valve seat 132b to close the fuel passage is urged by the fuel pressure in the fuel chamber 115 to compress the temperature sensitive spring 140, and is displaced as shown in FIG. 6. As a result, the high-pressure temperature sensitive valve 133 is moved away from the valve seat 132b, and the excess fuel is discharged through a gap between the valve seat 132b and the valve 133, making the fuel pressure always at a certain value, that is, the second set pressure of 3.5 kg/cm² (gauge pressure) higher than the first set pressure. Thus, the fuel is discharged through the outside of the high-pressure temperature sensitive valve 133, the communication holes 136 and 144 and the fuel outlet passage 131a to the fuel return passage 10, and is returned to the fuel tank 3.

When the fuel temperature decreases to temperatures lower than 80° C., the temperature sensitive spring 140 formed of shape memory alloy contracts. As a result, the back spring 138 urges downwardly the high-pressure temperature sensitive valve 133 until the valve 133 abuts against the stopper 139. Accordingly, the fuel is discharged through the outside of the temperature sensitive valve 133 to the fuel outlet passage 131a, and is returned through the fuel return passage 10 to the fuel tank 3. Then, the fuel pressure is adjusted at the gap between the valve member 121 and the outer valve seat 132a, and is returned to the first set pressure (2.55 kg/cm$^2$).

Having thus described the preferred embodiments of the invention, it should be understood that numerous structural modifications and adaptations may be made without departing from the spirit of the invention.

What is claimed is:

1. A pressure regulating valve for regulating a pressure of fuel to be supplied to a fuel injection device, comprising:
    a diaphragm chamber having a connecting portion for inducing an intake manifold vacuum in the vicinity of a nozzle hole of said fuel injection device;
    a fuel chamber having a connecting portion for inducing a fuel and located adjacent to said diaphragm chamber;
    a diaphragm for partitioning said diaphragm chamber from said fuel chamber;
    a diaphragm spring accommodated in said diaphragm chamber and biasing said diaphragm toward said fuel chamber;
    a valve member mounted to said diaphragm;
    a fuel discharging pipe communicated at its one end with said fuel chamber and communicated at the other end with the outside of said pressure regulating valve, said fuel discharging pipe being provided at its one end with a valve seat against which said valve member is releasably seated, wherein when a fuel pressure in said fuel chamber is equal to or greater than a first set pressure equal to the sum of a set pressure of said diaphragm spring and a pressure in said diaphragm chamber, said valve member moves away from said valve seat, while when the pressure in said fuel chamber is less than said first set pressure, said valve member seats on said valve seat;
    a temperature sensitive valve having a temperature sensitive spring formed of a shape memory alloy and a valve member operable by said temperature sensitive spring, wherein when a fuel temperature is equal to or greater than a set temperature of said shape memory alloy, said valve member of said temperature sensitive valve closes a fuel passage in said fuel discharge pipe; and
    a high pressure valve adapted to open said fuel passage in said fuel discharge pipe when said temperature sensitive valve is closed and the pressure in said fuel chamber is equal to or greater than a second set pressure higher than said first set pressure, whereby when the fuel temperature is less than said set temperature, the pressure in said fuel chamber is adjusted to be equal to said first set pressure, while when the fuel temperature is equal to or greater than said set temperature, the pressure in said fuel chamber is adjusted to be equal to said second set pressure.

2. The pressure regulating valve as defined in claim 1, wherein said fuel discharging pipe comprises a small-diameter portion forming a fuel inlet passage, a large-diameter portion forming a fuel outlet passage and a shoulder portion formed intermediate of said small-diameter portion and said large-diameter portion, and said valve member of said temperature sensitive valve comprises a substantially inverted U-shaped cylindrical member accommodated in said large-diameter portion of said fuel discharging pipe, and wherein when the fuel temperature is equal to or higher than said set temperature, said temperature sensitive spring expands to make the top portion of said cylindrical member abut against the inner surface of said shoulder portion of said fuel discharging pipe and thereby close a fuel passage in said fuel discharging pipe.

3. The pressure regulating valve as defined in claim 2 further comprising a stopper mounted at a lower opening of said large-diameter portion of said fuel discharging pipe, and wherein said temperature sensitive spring is engaged at its one end with said stopper and at the other end with said cylindrical member, and when the fuel temperature is equal to or higher than said set temperature, said temperature sensitive spring expands to make the top portion of said cylindrical member abut against the inner surface of said shoulder portion of said fuel discharging pipe and thereby close the fuel passage in said fuel discharging pipe.

4. The pressure regulating valve as defined in claim 3, wherein said cylindrical member is formed with a flange at an intermediate position of a side wall thereof, and said temperature sensitive spring is inserted under compression between said flange and said stopper, and further comprising a back spring inserted under compression between said flange and said shoulder portion for normally biasing said temperature sensitive valve in a valve opening direction, wherein when the fuel terperature is lower than said set temperature, the top portion of said cylindrical member is moved away from the inner surface of said shoulder portion to open the fuel passage of said fuel discharging pipe, while when the fuel temperature is equal to or higher than said set temperature, the top portion of said cylindrical member abuts against the inner surface of said shoulder portion to close the fuel passage in said fuel discharging pipe.

5. The pressure regulating valve as defined in claim 2, wherein said valve member of said temperature sensitive valve is formed at its top portion with a fuel inlet opening, said fuel inlet opening being formed at its inner circumference with a valve seat, and said high-pressure valve comprises a valve member adapted to be seated on said valve seat and a high-pressure spring for normally biasing said valve member of said high-pressure valve in a valve closing direction, wherein when a pressure in said fuel chamber becomes equal or higher than said second set pressure under the condition where the top portion of said valve member of said temperature sensitive valve is in abutment against said shoulder portion, said high-pressure valve is opened.

6. The pressure regulating valve as defined in claim 5 further comprising an adjusting screw threadedly engaged with the lower opening of said cylindrical member, wherein said high-pressure spring is supported by said adjusting screw at an end opposite said valve member of said high-pressure valve, and said second set pressure of said high-pressure valve is adjustable by said ajusting screw.

7. The pressure regulating valve as defined in claim 2, wherein said temperature sensitive valve and said high-pressure valve have a valve member and a valve seat in common, and when the fuel temperature is lower than said set temperature, said common valve member is separated from said common valve seat to open the fuel passage in said fuel discharging pipe, while when the fuel temperature becomes equal to or higher than said set temperature, said temperature sensitive spring expands to make said valve member abut against said valve seat, and when the fuel pressure in said fuel chamber is lower than said second set pressure under the abutting condition of said valve member and said valve seat, said valve member remains closed, while when the fuel pressure becomes equal to or higher than said second set pressure, said valve member is moved away from said valve seat to open the fuel passage in said fuel discharging pipe.

8. The pressure regulating valve as defined in claim 7 further comprising a stopper mounted at a lower opening of said large-diameter portion of said fuel discharging pipe, and wherein said temperature sensitive spring is engaged at its one end with said stopper and at the other end with said cylindrical member, and when the fuel temperature is equal to or higher than said set temperature, said temperature sensitive spring expands to make the top portion of said cylindrical member abut against the inner surface of said shoulder portion of said fuel discharging pipe and thereby close the fuel passage in said fuel discharging pipe.

9. The pressure regulating valve as defined in claim 7, further comprising a flange formed at a lower end of said valve member and a back spring inserted between said flange and said shoulder portion for normally biasing said valve member in a valve opening direction, wherein when the fuel temperature is lower than said set temperature, the fuel passage in said fuel discharging pipe is maintained in an open condition.

10. The pressure regulating valve as defined in claim 9, wherein said flange is formed with a plurality of fuel communicating apertures.

* * * * *